United States Patent [19]

Ayers

[11] Patent Number: 4,554,072

[45] Date of Patent: Nov. 19, 1985

[54] BARGE-BASED OIL BARRIER

[75] Inventor: Ray R. Ayers, Houston, Tex.

[73] Assignee: Shell Oil Company, Houston, Tex.

[21] Appl. No.: 655,394

[22] Filed: Sep. 27, 1984

[51] Int. Cl.[4] ............................................. B01D 21/24
[52] U.S. Cl. .................................. 210/242.3; 210/923
[58] Field of Search ..................... 210/776, 241, 242.1, 210/242.3, 242.4, 923; 114/232, 233, 234, 250

[56] References Cited

U.S. PATENT DOCUMENTS

| | | | |
|---|---|---|---|
| 3,684,095 | 8/1972 | Ayers | 210/242.3 |
| 3,771,662 | 11/1973 | Muramatsu et al. | 210/776 |
| 3,847,816 | 11/1974 | DiPerna | 210/776 |
| 3,926,812 | 12/1975 | Neal | 210/776 |
| 3,983,034 | 8/1976 | Wilson | 210/776 |
| 4,061,569 | 12/1977 | Bennett et al. | 210/776 |
| 4,116,833 | 9/1978 | Stagemeyer et al. | 210/776 |
| 4,136,008 | 1/1979 | Pogonowski et al. | 210/776 |
| 4,269,538 | 5/1981 | Hauan | 210/242.3 |
| 4,362,631 | 12/1982 | Bocard et al. | 210/776 |
| 4,381,994 | 5/1983 | Ayers | 210/120 |
| 4,428,319 | 1/1984 | Henning et al. | 210/923 |

Primary Examiner—Richard V. Fisher
Assistant Examiner—Wanda L. Millard

[57] ABSTRACT

An offshore oil spill cleanup system is provided which includes a barge arranged downstream of an oil spill to split the flow of oil to either side of the barge, two booms, each arranged on opposite sides of the barge to catch the diverted oil, and stationary skimmers working in the sheltered area behind the barge and within the booms to remove oil from the boom area to the barge. Diversionary booms are arranged upstream of the barge and chase skimming systems are located downstream of the barge and are functionable to move independently of the barge and recover any oil getting past the booms attached to the barge.

4 Claims, 1 Drawing Figure

BARGE-BASED OIL BARRIER

BACKGROUND OF THE INVENTION

Except for brief periods of successful oil skimming at the Ixtoc I oil spill off Mexico, attempts to mechanically recover reasonable quantities of oil spilled offshore have been largely unsuccessful to date. It is fortuitous that the same high winds and steep waves that render floating mechanical spill cleanup equipment useless, are the principal forces which rapidly and naturally disperse oil into the water column, preventing major damage to shoreline environment. In the offshore industry there is no offshore operation which is constrained so heavily by weather as oil spill cleanup operations. The majority of booms and skimmers are only operable in moderate (less than 4-foot) waves. A notable exception is the "SOCK" skimmer, U.S. Pat. No. 4,381,994, which recovered oil in 6 to 10-foot waves at the Ixtoc I spill. Unfortunately, offshore waves tend to damage and eventually destroy somewhat delicate booms and skimmers. Such devices must necessarily be light and flexible so that they are sufficiently wave compliant to encounter the floating oil at the water's surface. Hence, such booms and skimmers are only part of the answer to the problem of offshore oil spills.

Accordingly, the present invention is directed to providing a system which overcomes the above noted problems of the art and which is capable of recovering a reasonable percentage of oil spilled from a tanker accident, well blowout, or other offshore loss incident.

SUMMARY OF THE INVENTION

In solving the above problems of the prior art, the present invention utilizes the following parameters: (a) the spilled oil is concentrated, contained, and recovered near the source, (b) skimming operations are partially shielded from wave effects, (c) oil spill control systems are self-contained and capable of riding out rough weather without damage and (d) capital costs are minimized, with oil spill equipment and handling means being operable from ocean going vessels of opportunity.

In carrying out the present invention in accordance with the above criteria, the spill cleanup system includes the following: (a) two diversionary booms, with deployment and recovery boats for increased oil encounter width, (b) a self-contained barge-based oil concentration, recovery and storage system for primary cleanup, (c) at least one chase skimming system, such as the SOCK skimmer for secondary cleanup.

Accordingly, the present invention provides an oil spill cleanup system comprising a storage means arranged downstream of the oil spill to split the flow of the oil spill to either side of the storage means; two booms, each arranged on an opposite and at least partially sheltered side of the storage means to catch the diverted oil; and means associated with the booms to remove oil from the booms to the storage means. Preferably, the cleanup system also includes diversionary booms arranged upstream of the storage means and functionable to channel the flow of oil toward the storage means and at least one chase skimming system located downstream of the storage means and functionable to move independently of the storage means and recover any oil getting past the booms attached to the storage means. Most preferably, the storage means is a barge anchored to have one corner forward of the other corners in relations to the direction of flow of the oil spill, so that the barge swings freely with weather direction, with one boom attached to the other front corner of the barge, and the remaining boom attached to the forward-most rear corner of the barge.

DESCRIPTION OF PREFERRED EMBODIMENTS

Figure 1:
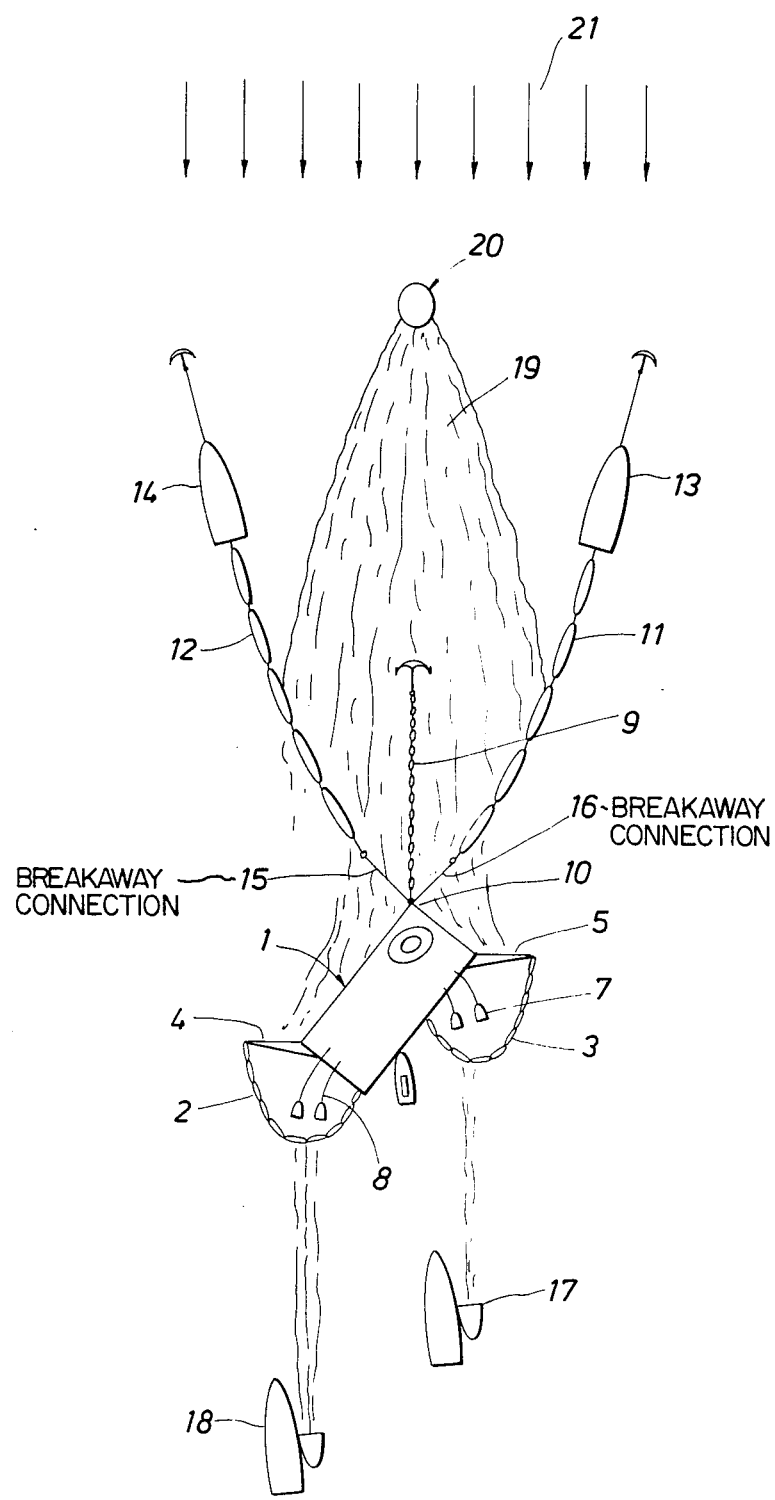
FIG. 1 shows a barge-based skimming system with diversionary booms and chase skimming and recovery subsystems combined.

The present invention is especially useful with two types of offshore oil spills: (a) tanker spills, and (b) well blowouts. Details of these incidents can be quite different, but the general approach to oil spill cleanup operations in accordance with the present invention is similar. A tanker spill is generally thought of as a short term event lasting from days to weeks. Although there is no typical spill rate, an initial large discharge is expected, followed by somewhat continuous smaller flow rate leakage, sometimes interrupted by brief larger volume discharges. Well blowouts like the Ixtoc I involved a rather long-term spill cleanup operation (measured in months) and loss rates would generally be large and continuous. Equipment mobilization is preferably as fast as possible, but more importantly, the equipment mobilized must be practical for a major long-term offsore operation. The present invention meets the needs of cleaning up both of these types of spills.

Over the last decade, significant advances have been made in design and performance of offshore booms and skimmers—most certainly because of the number of problems experienced under actual spill conditions with such equipment. The current major problems are: (1) integrating equipment into cleanup systems, and (2) providing rapid and effective deployment and retrieval equipment for oil cleanup devices. Thus, one goal of the present invention is to effectively utilize the capability of present day cleanup equipment; that is, the present invention involves positioning the booms and skimmers relative to each other so that the optimum cleanup environment is achieved. This makes it possible to attain the maximum overall oil recovery performance possible within weather limitations of the equipment. Further, when the weather becomes too severe, the booms and skimmers can be quickly recovered in accordance with the present invention to avoid damage and destruction.

The principal apparatus utilized by the present invention is an ordinary ocean going barge, which has moorings that are easily adjustable. An example of a barge-based skimming system is shown in FIG. 1, wherein an oil spill 19 results from an oil spill source 20 and flows in a weather direction 21 (indicated by arrows). The intent for such a system is to provide handling means attached to the deck of barge 1 to rapidly deploy and recover both the flexible booms 2 and 3, which are extended from rigid booms or arms 4 and 5, and the stationary skimmers 7 and 8. In the configuration shown, barge 1 is single-point moored with a mooring means 9, preferably from a corner 10 so that barge 1 will shield the flexible booms from oncoming waves, minimizing oil losses. A substantial part of each of booms 2 and 3 is in the leeward part of barge 1. This single-point mooring concept permits the barge to easily "weather vane" with the wind, wave and current forces. In addition, the barge can be easily re-positioned with respect to the oil spill source when necessitated by weather-induced changes in oil transport directions.

In order to enlarge effective oil encounter with the barge-based skimming system, one or more diversionary booms 11 and 12, held by single-point moored vessels 13 and 14, may be used, weather permitting. Operational considerations suggest that the boom be deployed and recovered from a separate (powered) vessel, such as vessels 13 and 14. Preferably, only the down-weather end of the boom is tied to the up-weather barge corner, by means 15 and 16, using a breakaway connection. Thus, the present invention permits the booms 11 and 12 to be towed away from the barge-based skimming system and recovered on tow vessels 13 and 14, should the weather become too severe. The other alternative of deploying and recovering diversionary booms from the barge is not as satisfactory because the boom system is difficult to retrieve in an up-weather mode. Also, the loosely tensioned boom could be damaged when thrown alongside the barge by waves during boom recovery operations. A final factor is that the barge becomes less mobile if the boom is stored on it because the boom must be recovered before the barge can be moved.

The remaining requirement for the present invention concerns the need for an active self-contained "chase" skimming system, like the "SOCK" skimming system, to recover oil loss from (under, over or around) the barge-based skimming system. Usually, the containment booms 2 and 3 cannot totally contain oil in a wave environment without leaking oil. Such containment booms are oil concentrators which temporarily provide a thick oil layer for skimming after which some of the remaining (unrecovered) oil, perhaps 10–40% of that encountered by the barge-based skimming system, will down-weather. Thus, chase skimmers (or some other secondary recovery means) are used to recover the narrow, concentrated streams of floating oil lost from the barge-based skimming system. Accordingly, the present invention uses chase skimming systems such as 17 and 18 to recover such oil.

The stationary skimmers 7 and 8 of the present invention generally require less complex (and less expensive) types of high volume stationary skimmers for operation in a thick (1-foot or more) layer of oil contained by the flexible booms 2 and 3 on the barge-based skimming system. On the other hand, absorbent disks are useful for minimizing the fraction of water in the oil when the oil layer is thin and when storage volume is limited. If there is sufficient oil present, as there would be in a large spill, it is only necessary to pump the large volumes of oil and some water from a wave sheltered location within the boom center drape area, directly to storage. Secondary processes involve decanting separated water from the storage tanks on the barge.

The foregoing description of the invention is merely intended to be explanatory thereof and various changes in the details of the described method and apparatus may be made within the scope of the appended claims without departing from the spirit of the invention.

What is claimed is:

1. An offshore oil spill cleanup system comprising:
   a barge arranged downstream of the oil spill to split the flow of the oil spill to either side of the barge;
   at least one diversionary boom arranged upstream of the barge and functionable to channel the flow of oil toward the barge;
   two containment booms arranged trailing an upstream part of the barge, each boom arranged on an opposite side of the barge to catch the diverted oil, with both booms at least partially sheltered by the barge from direct weather forces, the barge being anchored to have one corner forward of the other corner in relation to the direction of flow of the oil spill, with one containment boom attached to the other front corner of the barge, and the other containment boom attached to the forward-most rear corner of the barge; and
   means associated with the containment booms to remove oil from the booms to the barge.

2. The cleanup system of claim 1 wherein the diversionary boom is attached at one end with a breakaway connection to the barge and at an upstream end to a vessel.

3. The cleanup system of claim 1 including at least one chase skimming system located downstream of the barge and functionable to move independently of the barge and recover any oil getting past the booms attached to the barge.

4. The cleanup system of claim 1 wherein the means associated with the booms to remove oil from the booms to the barge are stationary skimmers.

* * * * *